United States Patent [19]

Maguire

[11] Patent Number: 5,155,332
[45] Date of Patent: Oct. 13, 1992

[54] MANUAL WELDING WIRE FEEDER

[76] Inventor: William J. Maguire, 10287 Jamestown Street, Ventura, Calif. 93004

[21] Appl. No.: 723,791

[22] Filed: Jul. 1, 1991

[51] Int. Cl.$^5$ .............................................. B23K 9/12
[52] U.S. Cl. ................... 219/137.2; 228/41
[58] Field of Search ............ 219/137.2, 136, 138; 228/41

[56] References Cited

U.S. PATENT DOCUMENTS

| | | | |
|---|---|---|---|
| 1,377,792 | 5/1921 | Rice | 219/138 |
| 3,356,273 | 12/1967 | Wallace | 228/41 |
| 3,999,697 | 12/1976 | Hill, Jr. | 219/137.2 |
| 4,068,106 | 1/1978 | Shaputis | 219/136 |
| 4,206,862 | 6/1980 | DaCosta | 219/137.2 |

FOREIGN PATENT DOCUMENTS

| | | | |
|---|---|---|---|
| 60-33869 | 2/1985 | Japan | 219/137.2 |
| 196210 | 7/1967 | U.S.S.R. | 228/41 |

Primary Examiner—Clifford C. Shaw
Attorney, Agent, or Firm—Marvin E. Jacobs

[57] ABSTRACT

A hand held welding wire feeder that is small enough and shaped correctly to fit within a users hand. A thumb operated feed wheel rolls against a springable idler roller with the wire guided between the two by tubes in line with the contact area between the thumb feed wheel and the idler roller. The exit tube can be telescoped to the desired length. The thumb wheel has a self centering valley and groove that adapt to any diameter wire.

9 Claims, 1 Drawing Sheet

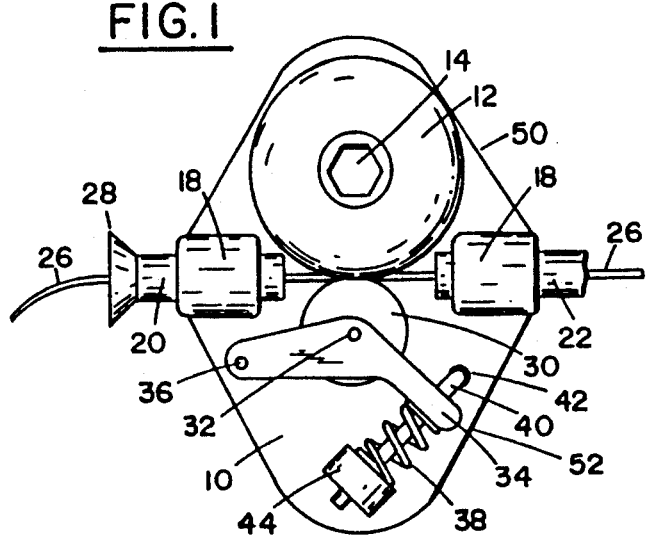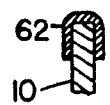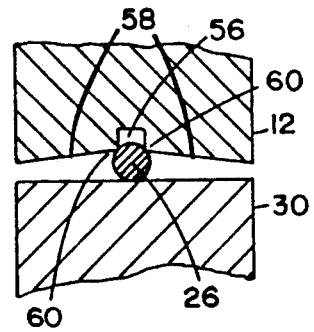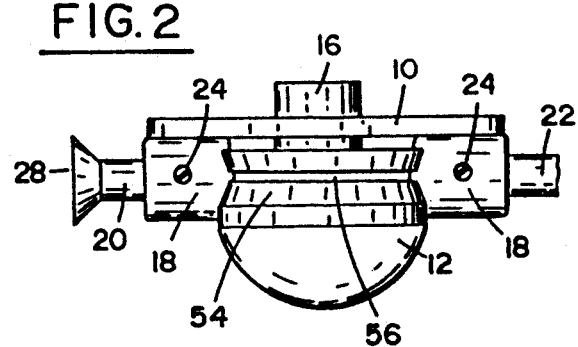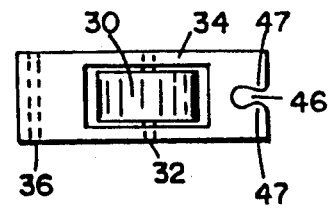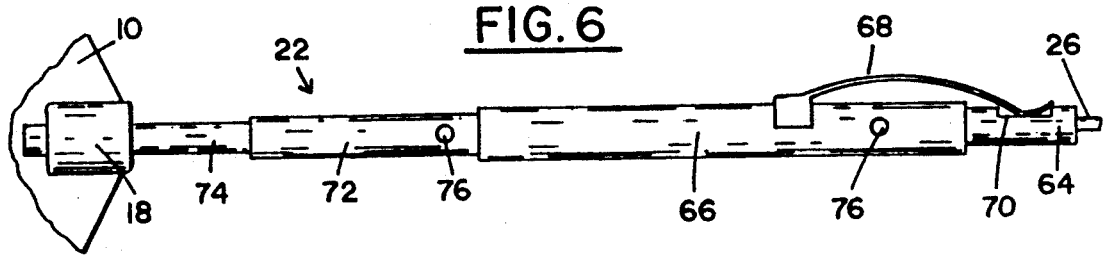

MANUAL WELDING WIRE FEEDER

TECHNICAL FIELD

This invention pertains to the welding arts, particularly machines to feed wire or rod to the seam being welded so as to supply seam filling metal thereto. Specifically, a hand held and hand operated wire and rod feeder is disclosed that is compact, easy to use, and low in cost.

BACKGROUND OF THE INVENTION

Metals may be joined together by welding them with an identical filler metal or brazing them with a different filler metal. High quality welding and brazing techniques require a worker in the art to heat the seam with a torch or electric arc held in one hand while slowly feeding a wire or rod of filler metal with the other hand. The wire filler must be slowly advanced into the melt zone of the weld to supply fill metal as required. If the wire is very thin and flexible, as often is the case for delicate work on thin metals, it is difficult to hold the continuously melting tip at the correct location without holding the wire at a point very close to the hot torch or arc. Heavy gloves are then needed to protect the worker from the heat. These gloves interfere with the dexterity needed to make high quality seams.

To help support and feed the filler wire, it is known to use expensive floor mounted machines that feed wire from a supply spool through a hollow tube. The worker can hold the tube in such a position that the fill wire coming from the end enters the melt zone of the weld operation. Since the tube is larger and stiffer than the wire, it can be held at a location farther removed from the heat source and is thus a bit safer. Such machines include motors to advance the wire which motors are remotely controlled with a switch or the like. Large power driven machines like this lack portability and convenience. Changing to a different size or type of filler wire is tedious and time consuming. And the fixed power driven machines are expensive. The present invention provides a very convenient hand operated wire feeder that accomplishes the same result at a much reduced cost with a great deal more flexibility.

STATEMENT OF THE PRIOR ART

U.S. Pat. No. 1,377,792 to Rice discloses a simple tube to hold welding wire or rod with a finger operated friction lock to fix the wire in the tube until more wire is desired at which time the wire is simply grasped and slid further into the tube.

U.S. Pat. No. 3,232,509 to Newton describes a glue applicator in which a thumb operated wheel frictionally advances a strip of thermoplastic into an iron to melt it for application to a surface to be cemented.

Three United States patents, U.S. Pat. No. 3,250,453 to Halstead, U.S. Pat. No. 3,252,645 to Zoltai, and U.S. Pat. No. 4,507,545 to Riordan all show solder wire feeders with wire engaging thumb wheels.

None of these patents teach a welding rod or wire feeder that fits within the palm of the hand so that it can be rotated to any position required by the work being done. Also the prior art does not have a thumb wheel that, by itself, both advances, centers, and guides wire of any diameter. Further, the art does not disclose a hemispherical thumb wheel that adapts to any thumb position or stroke length.

SUMMARY OF THE INVENTION

Briefly, the wire feeder of this invention uses a thumb rotated wheel to frictionally advance the wire through guide tubes toward the workpiece being brazed or welded. A pressure roller is springably urged against the wire to hold it in firm engagement with the thumb operated wheel. Both the thumb wheel and the pressure roller are supported on a base plate that is sized and shaped so as to fit in the palm of the users hand. The guide tubes are positioned to fit between the fingers of the user where they serve as additional position maintaining grip surfaces. The guide tubes may be interchanged to accommodate left or right hand use. A special hemispherically shaped thumb wheel conforms to any desired grip position. A telescoping guide tube allows the wire to be supported out to a variety of distances from the hand. The simplicity of this design allows wires to be almost instantly changed. Hence, different size and types of wire may be readily selected without a time consuming shutdown as is common with powered machines. This encourages and permits the use of leftover scraps of wire which are often found in large supply around welding shops. A number of additional features of the invention are described in the detailed description that follows and with reference to the drawings.

BRIEF DESCRIPTION OF THE DRAWING

FIG. 1 shows the wire feeder of the present invention in elevation from the side opposite the palm of the users hand when operated in a normal manner.

FIG. 2 is a top view of the feeder of FIG. 1 that better reveals the hemispherical thumb wheel and the groove therein that centers and grips the wire.

FIG. 3 is a top view of just the pressure roller assembly of FIG. 1.

FIG. 4 is a much enlarged, sectional, fragmentary view of a wire passing between the thumb wheel and pressure roller.

FIG. 5 is a detail drawing of the edge of the wire feeder showing an optional rubber cover stretched thereover to enhance the frictional grip on the feeder.

FIG. 6 shows the telescoping guide tube used in the preferred embodiment to hold the wire at a selected distance from the feeder.

DETAILED DESCRIPTION OF THE INVENTION

In FIG. 1, the wire feeder is shown in elevation. A diamond shaped base plate 10 has a thumb wheel 12 rotatably mounted thereon with a suitable bolt 14 and preferably a low friction bearing such as ball bearing positioned about bolt 14 and pressed into thumb wheel 12. Bolt 14 is threaded into an additional block 16 welded to the back of plate 10 as is most easily seen in the top view of FIG. 2. A pair of alignment blocks 18 are fastened to plate 10 by welding or other means so as to define a path for the wire that is generally tangential to the lower edge of thumb wheel 12. For a more rugged structure, base plate 10, block 16, and blocks 18 may all be machined from a single block of metal.

Blocks 18 have similar diameter holes in them to accept and support a rear entrance guide tube 20 and an exit guide tube 22. Tube 22 is only partly shown in FIGS. 1 and 2 but more fully described later with respect to FIG. 6. Set screws 24 lock guide tubes 20 and 22 in place in blocks 18.

Welding wire or rod 26 enters the feeder through a funnel 28 that eases entry and passes along the lower edge of thumb wheel 12 and exits through guide tube 22. To insure reliable frictional engagement with thumb wheel 12, a pressure roller 30 is springably urged against the underside of wire 26. Roller 30 rotates about an axle 32 pressed into a yoke 34. As with thumb wheel 12, roller 30 is preferably provided with a low friction bearing such as a ball bearing about axle 32.

Yoke 34 pivots on a pin 36 secured to base 10. A coil spring 38 surrounds an L-shaped rod 40 that hooks into a hole 42 in base 10. An adjustment nut 44 is threaded onto rod 40 so as to compress spring 38 against yoke 34. Rotation of nut 44 varies the force applied by spring 38 to pressure roller 30. L-shaped rod 40 passes through a slot 46 in yoke 34 as is more easily seen in the top view of the pressure roller assembly in FIG. 3. Slot 46 is narrower at its entrance end 47 to help retain rod 40 therein.

In use, the wire feeder is held in the palm of the hand. Looking at FIG. 1, the opposite side of base plate 10, where block 16 is located, rests against the users palm. Rear guide tube 20 may rest in the web between the thumb and forefinger. The forefinger and ring finger may wrap about edge 50 of base plate 10 while the remaining two fingers wrap about edge 52. Exit guide tube 22 passes between the fingers helping to secure the grip. In this position, the users thumb rests comfortably on thumb wheel 12. Bending the thumb pulls down on the wheel 12 and rolls wire 26 between thumb wheel 12 and pressure roller 30.

The wire feeder is shown about actual size in FIG. 1. At this size, it fits within the average hand quite nicely. It has been found that a thumb wheel about 1.5 inches in diameter provides a convenient amount of wire movement for a thumb stroke. As can be seen in FIG. 2, thumb wheel 12 has a hemispherical shape. Thus, the user can move his thumb a small amount and choose the radius of action. Grasping the wheel closer to the axis causes the wire to advance faster and farther for a given thumb stroke. Conversely, grasping the wheel farther out provides more leverage and easier movement over shorter distances. And since the wheel is generally hemispherical, it presents a rounded and comfortable surface no matter where it is gripped.

Welding usually demands that the wire be fed into the melt zone from a wide variety of directions. This is easily done with the present invention since the feeder can be rotated within the palm to any desired position, the users fingers shifting up or down relative to exit tube 22. Right handed operation is just as easy. Since blocks 18 are identical, guide tubes 20 and 22 are easily interchanged merely by loosening set screws 24 and switching the tubes.

Welding also employs wire of varying diameter which this feeder easily accommodates. In FIG. 2, it may be seen that thumb wheel 12 has a slight valley 54 with a groove 56 in the center. In the enlarged sectional view of FIG. 4, it may be seen that valley 54 comprises two slopes 58 that are about 5 degrees inclined relative to the surface of pressure roller 30. These slopes 58 move wire of varying diameter toward the center groove 56 when squeezed by pressure roller 30. The invention works well with wire from a diameter as low as 0.024 inches up through 3/32 of an inch, which are the most used and desired sizes, because groove 56 has two corners 60 that frictionally engage any diameter wire. Thus, without further guidance, the thumb wheel itself automatically centers and guides any diameter wire or rod.

FIG. 5 shows a layer of rubber like material stretched over the edge of base plate 10 to afford a more comfortable and frictional grip. This modification is optional.

Exit guide tube 22 may be of any fixed length to carry the wire to the melt zone and support the wire just adjacent to the melt zone so that the user need not hold the wire at a place uncomfortably close to the high heat. However, in the preferred embodiment, an adjustable length telescoping guide tube is utilized as shown in FIG. 6. A wire supporting tip 64 is held within a tube 66. A spring 68 mounted on tube 66 pressures against wire 26 through a hole 70 in tip 64. Spring 68 holds wire 26 steady during welding irrespective of the diameter of the welding wire. Spring 68 also holds the wire in place after it becomes too short to reach back to thumb wheel 12. Thus, small left over scraps of wire are easily used in the feeder as a consequence of spring 68. Spring 68 also prevents the wire from jumping forward as its end leaves thumb wheel 12. A spring tip such as this could be used on a fixed length guide tube, but FIG. 6 shows additional telescoping sections 72 and 74 that cooperate to form an adjustable length exit guide tube 22. Small holes 76 provide sight holes through which the position of the wire can be monitored. Since other modifications may be made to the invention which do not depart from the spirit and scope thereof, no limitation should be construed except in accordance with the appended claims and their equivalents.

I claim:

1. A manual welding wire feeder adapted to fit within the users hand comprising in combination:
   a base sized and shaped to fit in a users hand;
   a thumb wheel mounted for rotation on said base;
   a pressure roller mounted for rotation on said base in a position to roll against said thumb wheel, said roller springably urged against said thumb wheel; and
   guide means on said base adapted to define a path for welding wire which path passes through the location where the pressure roller rolls against the thumb wheel.

2. The feeder of claim 1 in which said guide means comprises a pair of interchangeable guide tubes mounted to said base through which said welding wire passes.

3. The feeder of claim 2 in which one of said guide tubes comprises a support guide tube that supports the welding wire out to a point remote from said feeder and adjacent the melt zone of the weld.

4. The feeder of claim 3 including a spring at said remote point that bears against the welding wire in the support guide tube so as to help hold it in place.

5. The feeder of claim 4 in which said support guide tube comprises a plurality of sections that telescope together so as to provide an adjustable length support guide tube.

6. The feeder of claim 5 in which said thumb wheel includes a groove about its periphery, the edges of said groove frictionally gripping welding wire of a variable diameter.

7. The feeder of claim 6 including sloped surfaces about the circumference of said thumb wheel on each side of said groove, said sloped surfaces causing the thumb wheel to have a decreasing diameter from the sides of the thumb wheel to the center of the thumb wheel adjacent said groove.

8. The feeder of claim 1 in which said thumb wheel includes a groove about its periphery, the edges of said groove frictionally gripping welding wire of a variable diameter.

9. The feeder of claim 8 including sloped surfaces about the circumference of said thumb wheel on each side of said groove, said sloped surfaces causing the thumb wheel to have a decreasing diameter from the sides of the thumb wheel to the center of the thumb wheel adjacent said groove.

* * * * *